United States Patent Office 3,763,070

Patented Oct. 2, 1973

1

3,763,070

HYDRAULIC CEMENT WITH POLYISOCYANATE AND ALIPHATIC POLYEPOXIDE

Herbert Jackson Shearing, Manchester, England, assignor to Imperial Chemical Industries Limited, London, England No Drawing. Filed May 21, 1971, Ser. No. 145,896
Claims priority, application Great Britain, June 3, 1970, 26,839/70
Int. Cl. C04b 25/02
U.S. Cl. 260—29.2 TN 4 Claims

ABSTRACT OF THE DISCLOSURE

Cement compositions suitable for flooring applications which comprise a hydraulic cement, a silica filler, water, an organic polyisocyanate and a compound or mixture of compounds selected from monohydric alcohols, monocarboxylic acids having a molecular weight of at least 60 and certain compounds which contain on average at least one epoxy group per molecule. The presence of the alcohols, carboxylic acids or epoxy compounds delays the rate of setting of the compositions, thus giving a longer working time. Cyclic epoxy compounds give cured products having a very high compression strength.

This invention relates to an improvement in or modification of the invention described in our U.K. specification No. 1,192,864.

Specification No. 1,192,864 describes and claims compositions having as essential ingredients a hydraulic cement, a silica filler, water and an organic compound containing a plurality of isocyanate groups. These compositions may also contain an isocyanate-reactive compound which may be a polyhydric alcohol, and aminoalcohol, a polyamine, a polyester or a polyesteramide, and preferably a dihydric or trihydric polyether having an equivalent weight of from 100 to 1500. We have now found that the properties of these compositions may be usefully modified by the inclusion therein of monofunctional alcohols and carboxylic acids and certain compounds which contain at least one epoxy group.

According to the present invention there are provided cement compositions having as essential ingredients a hydraulic cement, a silica filler, water, an organic polyisocyanate and a compound or mixture of compounds selected from monohydric alcohols, monocarboxylic acids having a molecular weight of at least 60, and compounds which contain on average at least one epoxy group per molecule, provided that when the epoxy compound is the reaction product of diphenylolpropane and epichlorohydrin, said epoxy compound contains not more than one hydroxyl group.

As examples of monohydric alcohols which may be used in the compositions there may be mentioned methanol, ethanol, propanol, butanol, hexanol, isooctanol, nonanol, decanol, dodecanol, cetanol, unsaturated alcohols such as allyl, oleyl and propargly alcohols and the polyether alcohols obtained by the interaction of alkylene oxides, for example, ethylene oxide and/or propylene oxide, with monohydric alcohols.

2

Monocarboxylic acids having a molecular weight of at least 60 which may be used in the compositions are, for example, the acids obtainable by oxidation of any of the above-mentioned monohydric alcohols which contain two or more carbon atoms, the mixed fatty acids derived from any of the oils mentioned below and also elaeostearic, linolenic, linoleic, oleic and stearic acids.

As examples of compounds which contain at least one epoxy group per molecule there may be mentioned epoxidised oils, such as those derived from rape seed, tobacco seed, soya bean, safflower, sunflower seed, grape seed, niger seed, poppy seed, hemp seed, candle nut, rubber seed, linseed, perilla, stillingia, chia, corophor, tung, oiticica, Japanese wood, poyok, soft lumbang, castor, dehydrated castor, tall and fish oils. There may also be used the products obtained by first esterifying the mixed fatty acids, obtainable from the above-mentioned oils by saponification, with monohydric alcohols, diols or polyols of higher functionality and then epoxidising the mixed esters so obtained. As further examples of compounds containing epoxy groups which may be used in the compositions of the present invention there may be mentioned the bis-epoxy compounds derived from diphenylolpropane and epichlorohydrin and which have the following general formula:

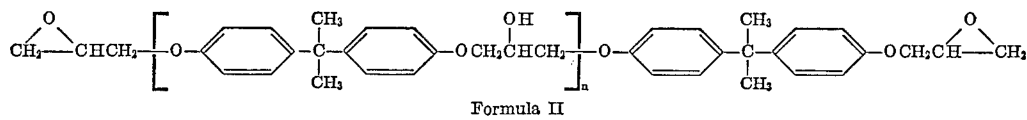

Formula II wherein $n$ is 0 or 1.

Other epoxy-containing compounds which may be used include those which contain at least one epoxycyclohexane or epoxycyclopentane group, for example, compounds having the general formula:

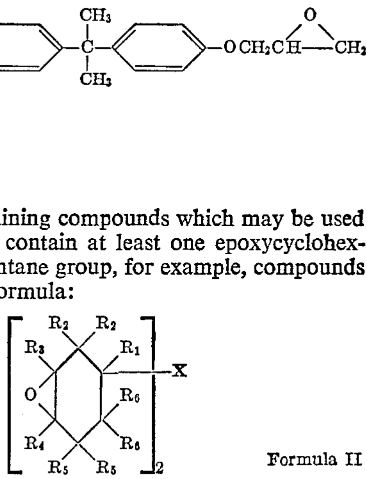

Formula II wherein X represents a divalent group having the formula:

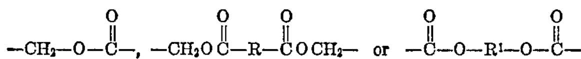

wherein

R represents a direct link or an alkylene or arylene group containing from 1 to 12 carbon atoms, $R^1$ represents a lower alkylene or lower oxyalkylene group and $R_1$–$R_6$ each represent a hydrogen atom or a lower alkyl group.

By lower alkylene, lower oxyalkylene and lower alkyl groups we mean such groups which contain from 1 to 4 carbon atoms. These and other suitable epoxy compounds are described in, for example, U.S. patent specifications Nos. 2,750,395, 2,890,195, 2,917,491, 3.027,357 and 3,-117,099. Epoxy groups do not undergo direct reaction with isocyanate groups, but the present compositions include water, which reacts with the isocyanate group to form a primary amino group and carbon dioxide. The primary amino group so liberated can react with an epoxy group, and it is believed that it is in this way that the epoxy compounds take part in the curing of the compositions. The epoxy compounds therefore serve as additional cross linking agents, adding to the polymer network built up by normal isocyanate reaction with water and any other isocyanate-reactive material which may be present.

The epoxy compounds for use in the present invention may also contain at least one isocyanate-reactive group, for example, a hydroxyl group.

In addition to the epoxy compounds defined above, there may also be used the esters which are obtained by the reaction of at least one fatty acid with an epoxy compound of Formula I in which $n$ is 0 to 12 inclusive, or with any of the other epoxy compounds which are disclosed above as being suitable for use in the compositions of the invention, and also the products which are derived from these esters by further epoxidation.

As examples of the fatty acids which may be reacted with epoxy compounds to give the esters described above there may be mentioned the mixed fatty acids derived from the oils mentioned above, also elaeostearic, linoleic, linolenic and oleic acids.

The term "hydraulic cement" is used in its usual sense to denote the class of structural materials which are applied in admixture with water and thereafter harden or set as a result of physical or chemical changes which consume the water present. As well as portland cement, it includes:

(1) Rapid hardening cements, as characterized by those with high alumina contents.

(2) Low-heat cements as characterized by high percentages of dicalcium silicate and tetracalcium alumino ferrite and low percentages of tricalcium silicate and tricalcium aluminate.

(3) Sulphate resisting cements as characterized by unusually high percentages of tricalcium silicate and dicalcium silicate and unusually low percentages of tricalcium aluminate and tetracalcium alumino ferrite.

(4) Portland blast-furnace cement as characterized by a mixture of portland cement clinker and granulated slag.

(5) Masonry cements as characterized by mixtures of portland cement and one or more of the following: hydrated lime, granulated slag, pulverised limestone, colloidal clay, diatomaceous earth or other finely divided forms of silica, calcium stearate and paraffin.

(6) Natural cements as characterized by material obtained from deposits in the Lehigh Valley, USA.

(7) Lime cements as characterized by oxide of calcium in its pure or impure forms and whether containing or not some argillaceous material.

(8) Selenitic cement as characterised by the addition of 5–10% of plaster of Paris to lime.

(9) Pozzolanic cement as characterised by the mixture of pozzolana, trass kieselguhr, pumice tufa, santorin earth or granulated slag with lime mortar.

(10) Calcium sulphate cements as characterised by those depending on the hydration of calcium sulphate and includes plaster of Paris, Keenes' cement and Parian cement.

As silica fillers which may be used, there may be mentioned sands and silicas of low clay content, preferably washed and having a particle size mainly within the range 1½"–200 B.S. sieve size (3.81–0.0076 cm.) although sizes outside these limits may be used for special applications. In place of, or in addition to, these silica fillers, the compositions may contain low density or fine particle size fillers as described in copending application of Alexander Ser. No. 123,419, filed Mar. 11, 1971.

As organic polyisocyanates which may be used, there may be mentioned tolylene diisocyanate and diphenyl methane diisocyanate, also uretedione or isocyanurate polymers of these, and isocyanate-ended polyurethanes obtained by reacting an excess of an organic diisocyanate with a polyfunctional isocyanate-reactive compound such as a glycol or higher polyhydric alcohol, amino alcohol or polyamine, a polyester, polyesteramide or polyether. There may also be used the polyisocyanate composition known as "crude MDI" which comprises a mixtures of diphenylmethane diisocyanate with methylene-linked polyphenyl polyisocyanates of higher functionality and which is obtained by phosgenation of the mixed polyamines prepared by condensing formaldehyde with aniline in the presence of hydrochloric acid.

The compositions of the invention may also contain solvents and thinners, which are inert to isocyanate groups, for example, esters, ketones, and hydrocarbons. Specific solvents which may be used include methyl ethyl ketone, methyl isobutyl ketone, 4-methyl-4-methoxy-pentan-2-one, ethyl acetate, butyl acetate, ethoxyethyl acetate, cyclohexanone, toluene and xylene.

In addition to the monohydric alcohol, monocarboxylic acid or epoxy compound as hereinbefore defined, the compositions of the present invention may also contain other isocyanate-reactive compounds, preferably a dihydric or trihydric polyether having an equivalent weight of from 100 to 1500. Polyhydric alcohols, aminoalcohols, polyamines, polyesters and polyesteramides may also be used as isocyanate-reactive additives. Where compositions having superior flexibility are required, there may be used as isocyanate-reactive compound the reaction product of castor oil with a hard resin, as described in copending application of Shearing Ser. No. 123,418, filed Mar. 11, 1971. The proportions of the different ingredients used in the present composition may be varied widely. Thus per 100 parts by weight of cement there may be used from 10 to 10,000 parts by weight of silica filler, from 10 to 75 parts by weight of water, from 5 to 5,000 parts by weight of resin-forming components, defined as organic polyisocyanate plus monohydric alcohol, monocarboxylic acid or epoxy comopund and any other isocyanate-reactive organic compound which may be present, and from 0 to 200 parts by weight of solvents. Preferred quantities are from 50 to 8,000 parts of filler, 20–50 parts of water, 10–4,000 parts of urethane resin and 0–100 parts of solvent.

The cement compositions described in our specification No. 1,192,864 set very rapidly and make it possible to obtain floors which are sufficiently stable to walk upon within 1 to 2 hours after laying.

This very rapid setting is sometimes disadvantageous, and we have found that by the use of monohydric alcohols, monocarboxylic acids or epoxy compounds in isocyanate-based cement compositions, as described above, the speed of setting of the compositions is initially retarded, thus providing a longer period within which the cement compositions, once prepared, can be worked. The material finally obtained after cure of the composition is, however, equally as hard as that obtained from compositions which do not contain these additives. The cyclic epoxy compounds give cured compositions having very high compression strengths.

Thus, cement compositions which do not contain a monocarboxylic acid, monohydric alcohol or an epoxy compound, but which include conventional polyfunctional isocyanate-reactive compounds such as polyols, polyester resins and alkyds, generally set in 2 hours or less, whereas by the use of the above-mentioned additives the setting time may be extended to 3 to 6 hours while still providing a material which is hard enough to take traffic after overnight curing. The additives produce the same effect as a liquid diluent in the initial stages of cure, resulting in a slowing down of the rate of setting, but thereafter they become chemically combined into the system with varying effects on the end products depending upon the structure of the additive and the amount used. This a material possessing on average only one epoxy group per molecule and no other isocyanate-reactive groups as a chain stopper and hence has a plasticising effect compared with a similar material used in an equivalent amount but on average having more than one epoxy group per molecule.

The cement compositions according to the present invention may be used self-levelling or trowelling flooring finishes, according to their fluidity. They may also be used to provide finishes having a decorative Terrazzo-like effect, as described in copending application Ser. No. 123,-420, filed Mar. 11, 1971. The invention is illustrated but not limited by the following examples in which parts and percentages are by weight.

EXAMPLE 1

100 parts of portland cement, 30 parts of an epoxy resin obtained by reacting diphenylolpropane with epichlorhydrin so that a material with an epoxide equivalent (grams of resin containing one gram equivalent of epoxide) of 175–210 is obtained, 25 parts of water and 300 parts of sand of 30–200 B.S. sieve size (0.05–0.0076 cm.) are churned together until the materials are evenly distributed and 100 parts of a 70% solution of a polyisocyanate (prepared as described below) are added and mixed in uniformly. When spread into a layer ½ inch (1.27 cm.) thick the composition sets in 3–4 hours and is hard enough to take traffic after overnight curing.

The polyisocyanate used is obtained by heating a mixture of tolylene diisocyanate (1 mole), trimethylolpropane (0.197 mole) and butylene glycol (0.159 mole) for 2 hours at 60° C. in the presence of half their combined weight of 1:1 mixture of β-ethoxy ethylacetate and xylene. 0.029 mole of an oxypropylated glycerol of molecular weight 3000 is added and heating is continued for 4 hours at 60° C. Sufficient xylene is then added to give a solution of 70% solids content.

EXAMPLE 2

100 parts of portland cement, 30 parts of an octyl epoxy stearate, obtained by epoxidising octyl oleate, 25 parts of water and 300 parts of sand are churned together until the materials are evenly distributed and 100 parts of a 70% solution of a polyisocyanate (as used in Example 1) are added and mixed in uniformly. When spread into a layer ½ inch (1.27 cm.) thick the resulting composition sets in 5–6 hours and is hard enough to take traffic after overnight curing.

EXAMPLE 3

If in Example 2 the 30 parts of octyl epoxystearate are replaced by 30 parts of an epoxidised soya bean oil, a similar composition is obtained which sets in 4–5 hours.

EXAMPLE 4

100 parts of portland cement, 20 parts of a monohydric alcohol (obtained as described below), 25 parts of water and 300 parts of sand of 30–200 B.S. sieve size (0.05–0.0076 cm.) are mixed together until a uniform composition is obtained. 100 parts of a 70% solution of a polyisocyanate (as used in Example 1) are then added with further mixing. When the polyisocyanate solution is evenly dispersed the fluid mix is spread into a layer ½ inch (1.27 cm.) thick, when it sets to the point where it is firm enough to walk on in 4–5 hours. The monohydric alcohol used in this example was obtained as follows:

A mixture of isooctanol (2000 parts), benzene (250 parts) and potassium hydroxide (69 parts) is azeotroped for 10 hours, then the benzene is distilled off at 150° C. 312 parts of the resultant product are heated at 100° C. under a nitrogen atmosphere and 3800 parts of an equimolecular mixture of ethylene and propylene oxides are added during 8½ hours keeping the temperature at, or just below, 110° C. The mixture is stirred at this temperature for 1 hour after the addition is complete and then for a further 30 minutes at a pressure of 15 mm. Adipic acid (6.25 parts) and water (120 parts) are added and the mixture is stirred at 100° C. for 5 minutes. 41 parts of activated carbon are added and the mixture is heated in vacuo at 80–100° C. for 1½ hours and then filtered hot.

The product has a hydroxyl value of 36 mg. KOH/gm. and an acid value 0.5 mg. KOH/gm.

EXAMPLE 5

If in Example 4 the 20 parts of monohydric alcohol are replaced by 20 parts of linseed oil fatty acids, a composition is obtained which sets hard enough to walk on in about 4 hours.

EXAMPLE 6

100 parts of portland cement, 300 parts of sand of 30–200 B.S. sieve size (0.05–0.0076 cm.), 33 parts of 3,4-epoxycyclohexylmethyl - 3,4 - epoxycyclohexanecarboxylate and 25 parts of water are churned together until the materials are eventy distributed. 67 parts of tolylene diisocyanate are added and mixed in uniformly. When spread into a layer ½ inch (1.27 cm.) thick the resulting composition sets to the stage where it is firm enough to walk on in about 4 hours.

EXAMPLE 7

If in the above example the 33 parts of 3,4-epoxycyclohexylmethyl - 3,4 - epoxycyclohexanecarboxylate are replaced by 33 parts of bis (3,4-epoxy-6-methylcyclohexylmethyl)adipate a similar composition is obtained which also sets in about 4 hours.

EXAMPLE 8

80 parts of portland cement, 30 parts of butanol, 20 parts of water and 320 parts of sand of 30–200 B.S. sieve size (0.05–0.0076 cm.) are mixed together until the materials are evenly distributed. 100 parts of a 70% solution of a polyisocyanate (as used in Example 1) are added and mixed in uniformly. When spread into a layer ½ inch (1.27 cm.) thick, the resulting composition sets to the stage where it is hard enough to walk on in about 3 hours.

EXAMPLE 9

100 parts of portland cement, 30 parts of mixed oleyl/cetyl alcohols (having an iodine value of 50–55), 20 parts of water and 300 parts of sand of 30–200 B.S. sieve size (0.05–0.0076 cm.) are mixed together until the materials are evenly distributed. 125 parts of 70% solution of a polyisocyanate (as used in Example 1) are added and mixed in uniformly. When spread into a layer ½ inch (1.27 cm.) thick the resulting composition sets in about 5 hours and is hard enough to take traffic after overnight (16 hours) curing.

EXAMPLE 10

80 parts of portland cement, 20 parts of isodecanol, 20 parts of water and 60 parts of crude MDI (containing approximately 50% of diphenylmethane-4,4′-diisocyanate, the remainder being methylene-linked polyphenyl polyisocyanates of higher functionality) are mixed together and finally 300 parts of sand are added and mixed in until evenly dispersed. When spread into a layer ½ inch (1.27 cm.) thick the resulting composition sets to a stage where it is firm enough to walk on in about 3 hours.

EXAMPLE 11

100 parts of portland cement, 30 parts of oleic acid, 20 parts of water and 300 parts of sand are mixed together and 65 parts of crude MDI (as used in Example 10) are added and mixed in uniformly. When spread into a layer ½ inch (1.27 cm.) thick, the resulting composition sets firm in 3–4 hours and is hard enough to walk on after overnight curing.

EXAMPLE 12

100 parts of portland cement, 20 parts of propionic acid, 20 parts of water and 350 parts of sand are mixed together and 100 parts of a 70% solution of a polyisocyanate (as used in Example 1) are then mixed in. When spread into a layer ½ inch (1.27 cm.) thick, the resulting composition sets in about 6 hours and is hard enough to walk on after overnight curing.

EXAMPLE 13

33 parts of 3,4-epoxycyclohexylmethyl-3,4-epoxycyclohexane carboxylate are mixed with 100 parts of portland cement, 300 parts of sand and 25 parts of water until an even dispersion is obtained. 66 parts of crude MDI (as used in Example 10) are then mixed in and the composition is cast into cubes by pouring it into cubical moulds with 4 inch (10.2 cm.) sides, and allowed to cure. After 24 hours the cast cubes are removed from the mould and when tested are found to have a compression strength of approximately 5980 lbs./in.$^2$ (41 kg./cm.$^2$). After 14 days this value rises to approximately 7750 lbs./in.$^2$ (545 kg./cm.$^2$).

If the 33 parts of cyclic epoxy compound in the composition is replaced by an equal weight of the reaction product of castor oil wth a hard resin (obtained as described below), cast cubes of the resulting compositions have a compression strength of approximately 5450 lb./in.$^2$ (383 kg./cm.$^2$) after 24 hours and approximately 5900 lb./in.$^2$ (415 kg./cm.$^2$) after 14 days.

The castor oil/hard resin reaction product used in this example is prepared as follows:

320 parts of 1st Pressings castor oil are heated together with 80 parts of an esterified rosin-modified phenol formaldehyde resol resin at 240° C. for 45 minutes. The latter ingredient is the glycerol ester of the product from the reaction between rosin and a diphenylolpropane formaldehyde resol resin.

What I claim is:

1. Cement compositions which are the products obtained by mixing together and allowing to cure components comprising as essential ingredients a hydraulic cement, a silica filler, water, an organic polyisocyanate and a compound or mixture of compounds from the group consisting of epoxy compounds which contain two epoxycyclohexane or epoxycyclopentane groups.

2. Cement compositions as claimed in claim 1 wherein the compound containing two epoxycyclohexane groups has the formula

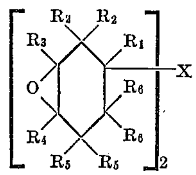

in which X represents a divalent group having the formula

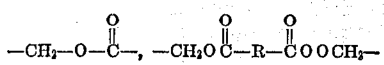

or

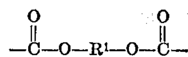

wherein

R represents a direct link or an alkylene or arylene group containing from 1 to 12 carbon atoms $R^1$ represents an alkylene or an oxyalkylene group containing from 1 to 4 carbon atoms and $R_1$ to $R_6$ each represent a hydrogen atom or an alkyl group containing from 1 to 4 carbon atoms.

3. Cement compositions as claimed in claim 1 which also contain a solvent which is inert to isocyanate groups.

4. Flooring surfaces whenever obtained from a cement composition as claimed in claim 1.

References Cited

UNITED STATES PATENTS

| | | | |
|---|---|---|---|
| 3,240,736 | 3/1966 | Beckwith | 106—90 |
| 2,788,335 | 4/1957 | Barthel | 260—2.5 AK |
| 3,211,675 | 10/1965 | Johnson | 260—2.5 AK |
| 3,354,099 | 11/1967 | Stegman | 260—2.5 AK |
| 3,477,979 | 11/1969 | Hillyer | 106—90 |
| 2,305,113 | 12/1942 | Scripture | 106—95 |

FOREIGN PATENTS

| | | | |
|---|---|---|---|
| 1,192,864 | 5/1970 | Great Britain | 260—29.2 TN |
| 893,273 | 4/1965 | Great Britain | 260—29.2 TN |
| 195,944 | 7/1965 | U.S.S.R. | 260—292 TN |

JOHN C. BLEUTGE, Primary Examiner

A. H. KOECKERT, Assistant Examiner

U.S. Cl. X.R.

117—161 KP; 260—2.5 AK, 18 EP, 18 TN, 31.4 EP, 33.6 EP, 37 EP, 830 R